US008800473B1

(12) United States Patent
DeVerse et al.

(10) Patent No.: US 8,800,473 B1
(45) Date of Patent: Aug. 12, 2014

(54) MASS VELOCITY SENSOR DEVICE AND METHOD FOR REMOTE MONITORING AND VISUAL VERIFICATION OF FLUID VELOCITY

(76) Inventors: Richard DeVerse, Kailua Kona, HI (US); Mick Chavez-Pardini, Kamuela, HI (US)

(*) Notice: Subject to any disclaimer, the term of this patent is extended or adjusted under 35 U.S.C. 154(b) by 132 days.

(21) Appl. No.: 13/205,551

(22) Filed: Aug. 8, 2011

Related U.S. Application Data

(60) Provisional application No. 61/401,042, filed on Aug. 6, 2010.

(51) Int. Cl.
*G01F 1/28* (2006.01)
*G01P 5/04* (2006.01)
*G01P 13/00* (2006.01)

(52) U.S. Cl.
USPC .......................... 116/275; 116/276; 73/861.75

(58) Field of Classification Search
CPC ............... G01F 1/22; G01F 1/26; G01F 1/28; G01F 1/30; G01P 5/04; G01P 13/00; G01P 13/0026; G01P 13/0033; G01P 13/008
USPC ......... 116/264, 265, 266, 267, 271, 273, 275, 116/276; 73/861.74, 861.75, 861.76, 73/861.56, 861.58; 137/557
See application file for complete search history.

(56) References Cited

U.S. PATENT DOCUMENTS

| | | | | |
|---|---|---|---|---|
| 335,213 A | * | 2/1886 | Brown | 73/861.75 |
| 825,863 A | * | 7/1906 | Oliver | 73/861.75 |
| 1,249,484 A | * | 12/1917 | Pogue | 73/861.74 |
| 1,292,334 A | * | 1/1919 | Larsen | 200/81.9 R |
| 1,712,761 A | * | 5/1929 | Furnivall et al. | 73/861.75 |
| 2,075,424 A | * | 3/1937 | Bull | 73/186 |
| 2,985,731 A | * | 5/1961 | Taylor | 200/81.9 HG |
| 3,085,432 A | * | 4/1963 | Bloom et al. | 73/861.75 |
| 3,251,335 A | * | 5/1966 | Dannevik | 116/275 |
| 3,745,967 A | * | 7/1973 | Smith et al. | 116/275 |
| 3,857,277 A | * | 12/1974 | Moore | 73/861.74 |
| 3,857,288 A | | 12/1974 | Neugebauer | |
| 3,914,994 A | * | 10/1975 | Banner | 73/114.68 |
| 3,939,796 A | * | 2/1976 | Smith et al. | 116/271 |
| 3,955,415 A | * | 5/1976 | Sharon | 73/861.74 |
| 4,484,536 A | * | 11/1984 | Henocque et al. | 116/275 |
| 4,501,158 A | * | 2/1985 | Pelikan | 73/861.58 |
| 5,228,469 A | * | 7/1993 | Otten et al. | 137/80 |
| 5,881,667 A | * | 3/1999 | Herbert | 116/209 |
| 5,945,608 A | * | 8/1999 | Hutchinson | 73/861.24 |
| 6,032,540 A | | 3/2000 | Hawkins | |
| 8,397,587 B2 | * | 3/2013 | Brill et al. | 73/861.94 |

FOREIGN PATENT DOCUMENTS

| | | | | | |
|---|---|---|---|---|---|
| JP | | 07270440 A | * | 10/1995 | G01P 5/04 |
| WO | WO 8902065 | A1 | * | 3/1989 | G01F 1/28 |

\* cited by examiner

*Primary Examiner* — R. A. Smith
(74) *Attorney, Agent, or Firm* — Knobbe Martens Olson & Bear, LLP

(57) ABSTRACT

A wireless multi-range, mass velocity sensor assembly for remote monitoring with direct on-site visual validation of mass velocity is provided. In certain implementations, the sensor assembly comprises a channel body fixture, an obstruction mounted within an aperture formed in the inlet or outlet of the channel body fixture, and an arcuate indicator that protrudes above the fluid flow path and provides clear visual readout of the flow velocity. In some implementations, the sensor assembly can be easily adapted for existing back check valve and other back flow prevention devices.

7 Claims, 17 Drawing Sheets

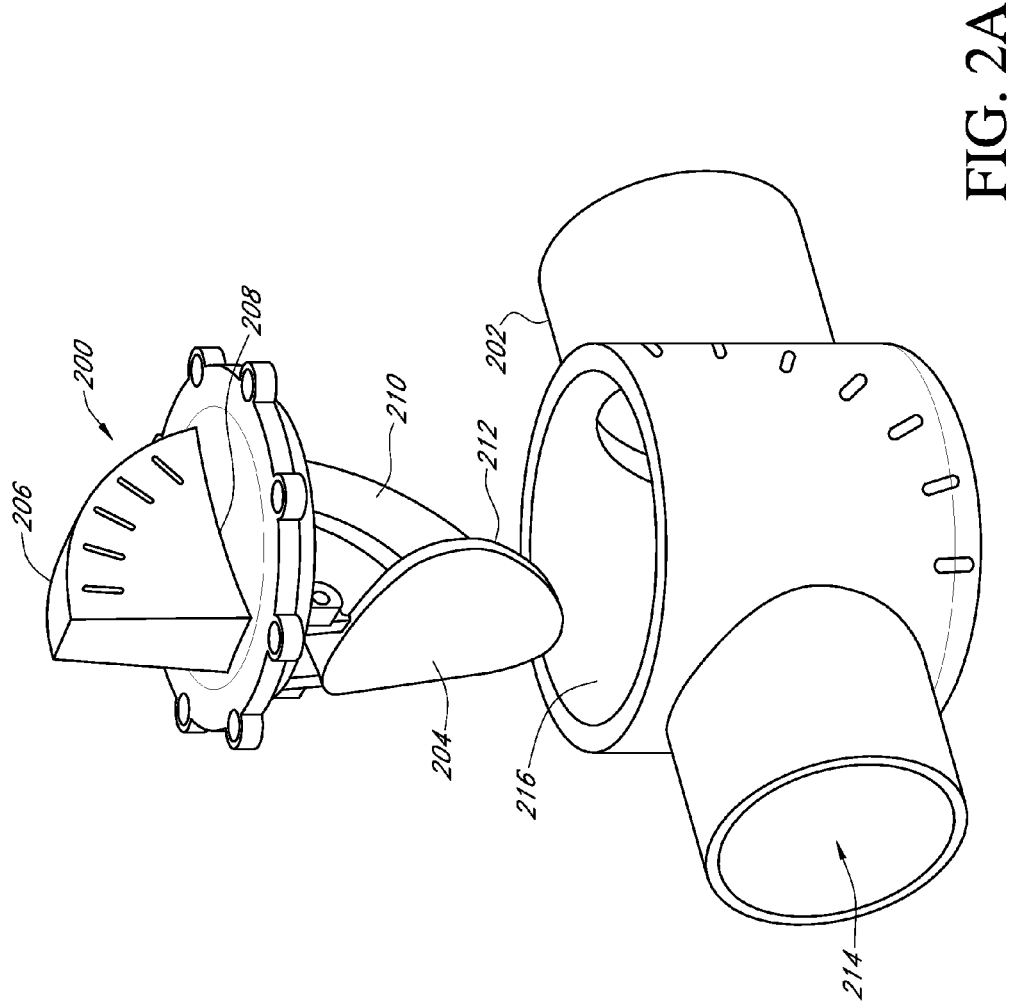

+

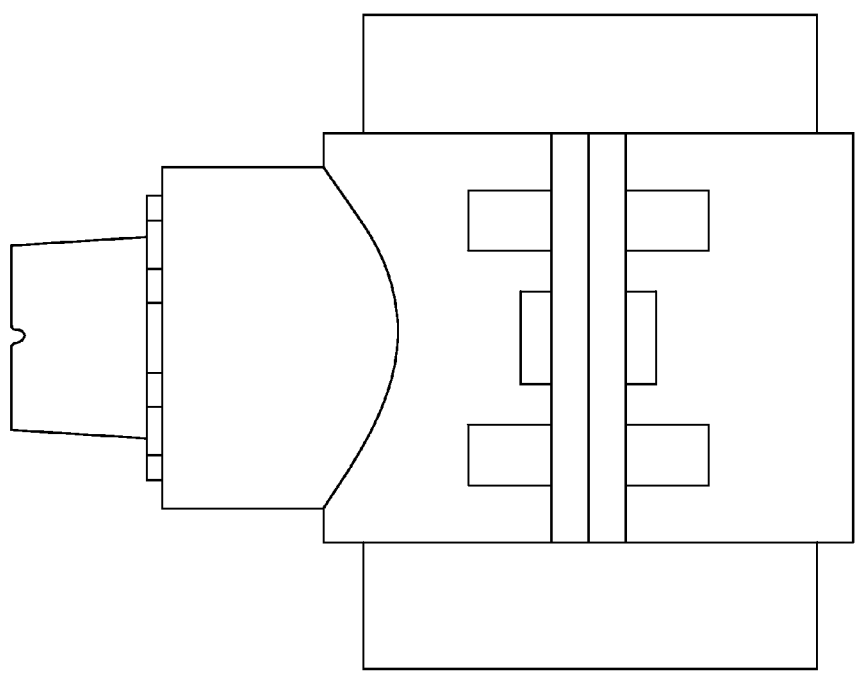

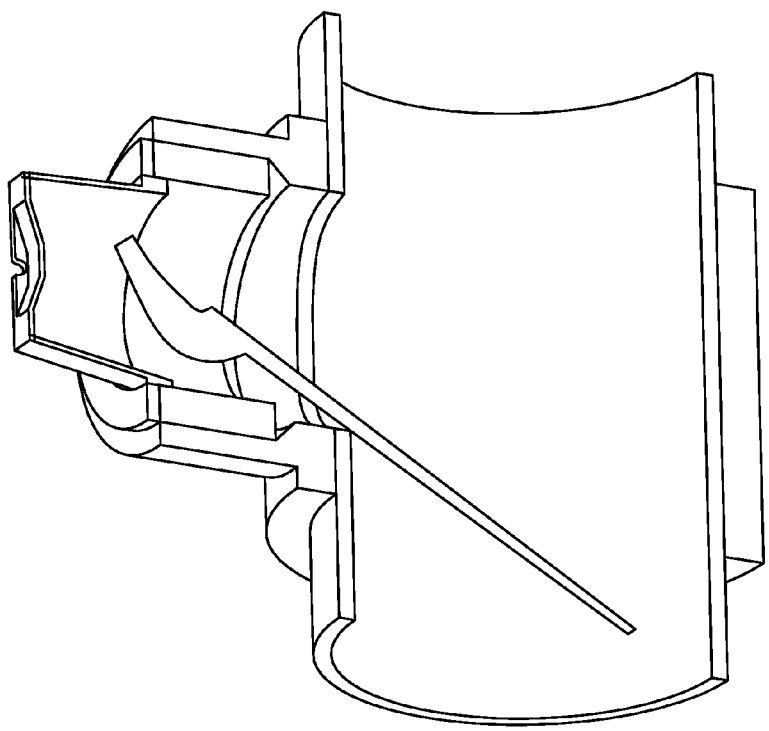

MASS VELOCITY SENSOR DEVICE AND METHOD FOR REMOTE MONITORING AND VISUAL VERIFICATION OF FLUID VELOCITY

CROSS-REFERENCE TO RELATED APPLICATIONS

This application claims the benefit of priority under 35 U.S.C. §119(e) of U.S. Provisional Application No. 61/401,042 filed on Aug. 6, 2010, the entirety of which is incorporated herein by reference.

BACKGROUND OF THE INVENTION

1. Field of the Invention

This invention generally relates to fluid flow sensing devices, and more particularly, relates to an in-line fluid flow sensor assembly designed to provide remote monitoring and visual verification of fluid flow through various fluid piping systems.

2. Description of the Related Art

Flow rates of fluids, gas, and loose solids are a measure of interest in plumbed, pumped, piped and channelized flow streams. In some plumbing systems, these flow streams can stretch over great distance and monitoring of the plumbing subsections become difficult. Various devices have been developed to measure in-line fluid flow in pipes and other channel systems. Flow indicators utilizing a flap or vane configured to flexure in response to fluid flow are commonly used to monitor flow velocity. For example, U.S. Pat. No. 3,857,288 discloses a flow indicator that uses a flexible flap hingedly connected to a housing. The flap is visible through a transparent observation port disposed at about the same level as the fluid flow. U.S. Pat. No. 6,032,540 discloses a mechanical in-line flow indicator designed to measure the velocity of fluid flow through field drip irrigation systems. The flow indicator utilizes a rather complex mechanical system comprising a pivotable paddle that is disposed in the fluid flow and a lever that is positioned above the paddle and engages with the paddle through permanent magnets. While the lever indicator is positioned above the fluid flow, the system cannot be easily adapted to retrofit existing backflow check valves.

As with most conventional flow meters, on-site real time monitoring is difficult as one would need to be in fairly close vicinity to the flow indicator in order to see through the observation port to make visual verification of the flow rate. Additionally, most conventional flow indicator systems are stand-alone devices that cannot be easily incorporated as part of an existing valve. As such, there is a need for an improved system and method for on-site real time measuring and monitoring fluid flow through pipes and other channels.

SUMMARY OF THE INVENTION

A wireless multi-range, mass velocity sensor for remote monitoring with direct on-site visual validation of mass velocity is provided. In certain preferred embodiments, the sensor comprises a channel body fixture and an obstruction mounted within an aperture formed in the inlet or outlet of the channel body fixture. Mass from flow of material such as water or other fluid in the system impinges upon the obstruction within the aperture. In one embodiment, the obstruction is preferably hinged perpendicular to the flow direction through the aperture and is assembled with a coaxially mounted spring. This spring supplies an opposing force to the mass flow and opposes the movement of the obstruction about the axis of the hinge. The force of momentum of the mass movement against the obstruction needs to overcome the springs opposing force within the aperture before the obstruction can move. The obstructions movement about the hinged axis can be measured and estimated simultaneously using an electronic and visual means. The angle of the obstruction for a given situation is relative to the velocity of the mass flow through the aperture.

In one preferred embodiment, a substantially clear sealed lid mounting structure that is separable and affixed to the channel body fixture allows for easy maintenance and adjustment and replacement of the spring as well as adjustment of a pre-load that works to change range of operation. In one implementation, adding a stiffer spring constant or force allows for a decrease in the resolution of a fixed scale so imprinted or affixed to the outside of the lid mounting structure. Moreover, an appendage can be mounted to the obstruction. Preferably, the appendage is curved so as to follow a prescribed path into a curved lid receiver pocket built into the lid mounting structure. In some embodiments, an electronic environment sensor that is additionally affixed to this lid allows wirelessly enabled remote monitoring of the mass velocity through the aperture. When the substantially hollow plastic appendage is pushed up into the receiver pocket, it works to displace fluid within the lid and allows an indirect sensing of velocity while simultaneously affords a visible confirmation of velocity of the mass within the channel body fixture through the aperture. By changing the electronic sensing means to optical sensing means provides other modes of electronic monitoring.

One preferred embodiment of the invention comprises a restriction or aperture that is sealed in one direction by way of a flap that is spring loaded in one direction. This flap pivots about an axis of a shaft that is perpendicular to the flow axis and is housed in a lid that allows a protrusion so affixed to the back of the flap to protrude out of the body of the back check valve body. The obstruction in this embodiment is the flap seal that allows flow of fluid in only one direction through the aperture. The flap is located in the flow stream of a fluid that is mounted as to rotate about a shaft whose axis is perpendicular to the flow direction. The obstruction is so designed so as to resist debris and fouling. Resistance to the rotation about the shaft is regulated by springs that may or may not be coaxial with the shaft. There is an adjustable flap swing limit. The spring or set of springs allow calibration of the amount of rotation relative to the flow. A stiffer spring would restrict flow ranges to higher flow velocities. A weaker spring would result in lower flow range sensitivity.

In one preferred embodiment the restriction is mounted in a clear plastic material so it is in the flow stream of the fluid. Springs that are co-axial with the shaft apply a constant force that opposes rotation of the restriction when the fluid is flowing in one direction. The clear mounting structure has an opening that allows an appendage affixed to the restriction within the flow to be viewed as it moves in relation to the restriction rotation. As fluid flow increases the appendage moves into the clear opening in clear view of observers no matter what viewing angle. It is a feature of this invention that viewing the flow rate from a distance is made easier. Electronic and optical position sensing solutions enable electronic transduction of flow data in both analog and digital form.

BRIEF DESCRIPTION OF THE DRAWINGS

FIGS. 2A and 2B illustrate a flow sensor assembly of another preferred embodiment adapted to be mounted to existing back check valves and other backflow prevention devices;

FIGS. 11A and 11B illustrate a series of inserts that can be used to adapt the sensor multi-purpose lid of certain preferred embodiments to various pipe diameters.

DETAILED DESCRIPTION OF THE PREFERRED EMBODIMENT

Figure 1A:
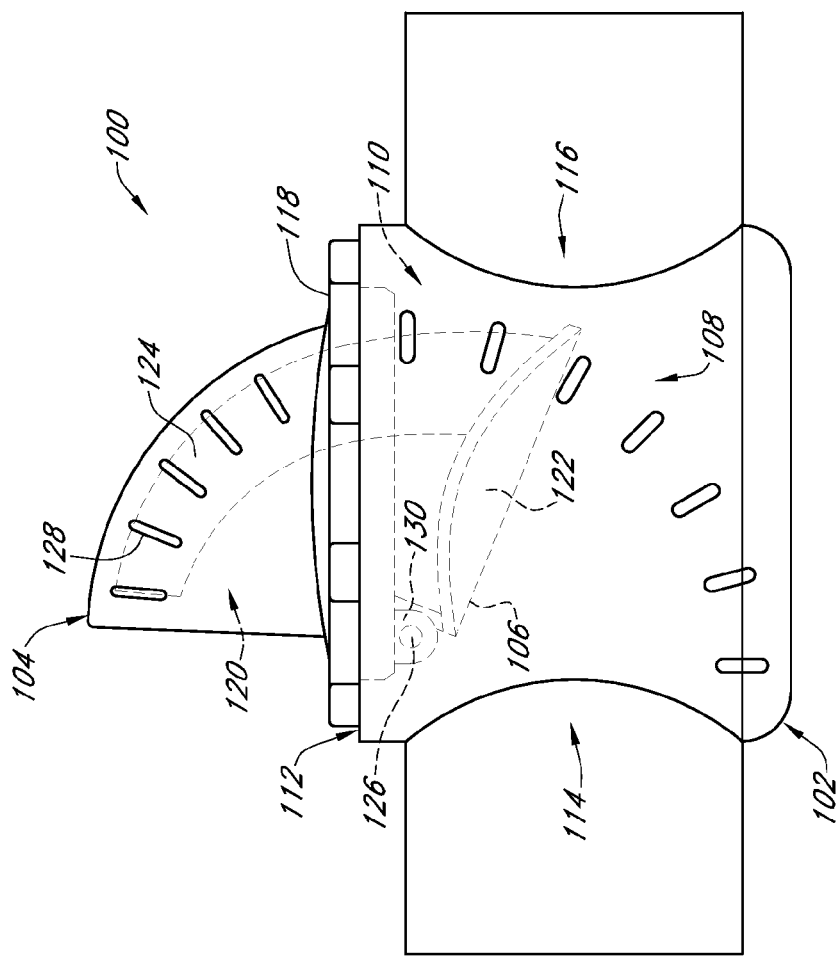
FIGS. 1A-1C illustrate flow sensor assemblies according to one preferred embodiment of the present invention.
Figure 1B:
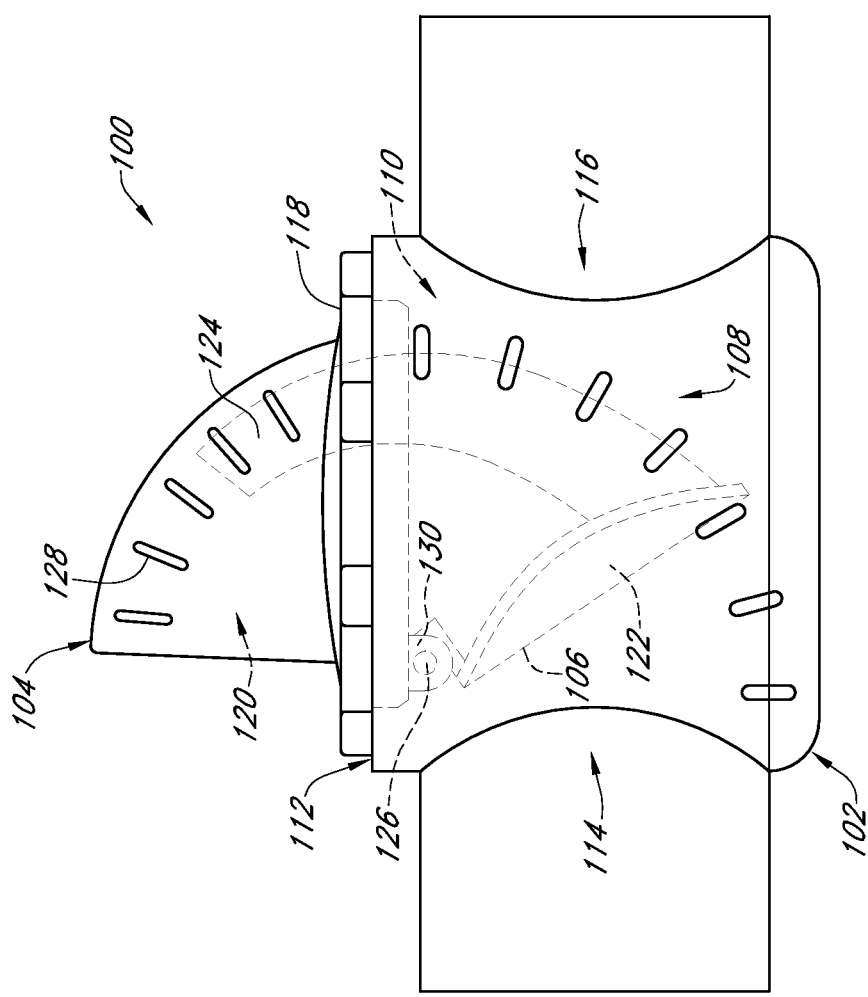

Reference will now be made to the drawings wherein like numerals refer to like parts throughout. FIGS. 1A and 1B illustrate a flow sensor assembly 100 according to one embodiment of the present invention. The flow sensor assembly 100 generally comprises a mounting body 102, a protruding lid 104 extending upwardly above the mounting body 102, and a pivotable obstruction member 106 disposed inside the mounting body 102. The mounting body 102 is configured with sidewalls 108 defining a receptacle 110 having an upper opening 112, and fluid inlet 114 and outlet 116 ports disposed on opposing sides of the receptacle 110. The mounting body 102 can be positioned in a flow stream, such as fitted to a conventional pipe or channel segment using fittings and methods known in the art. The protruding lid 104 has a base rim 118 and a receiver pocket 120 extending upwardly from the base rim 118. The base rim 118 is sealingly engaged with the mounting body 102 using screw type fasteners or other mechanical methods to close off the upper opening 112 of the receptacle 110. In certain preferred embodiments, the protruding lid 104 is easily detachable from the mounting body 102.

As further shown in FIGS. 1A and 1B, the pivotable obstruction member 106 comprises a flapper 122 and an appendage 124 extending laterally from a distal end of the flapper 122. As discussed in greater detail below, the configuration of the flapper 122 can be designed to affect the dynamics of the fluid flow through the mounting body 102. In one embodiment, the flapper 122 is configured such that the cross-sectional area changes relative to the pivot angle. In one implementation, the pivotable obstruction member 106 is hingedly attached to the protruding lid 104 via a rotatable shaft 126 and pivots in a manner such that the appendage 124 travels between the receptacle 110 and the receiver pocket 120 in a manner as shown in FIGS. 1A and 1B. In one implementation, the appendage 124 and the receiver pocket 120 both have an arcuate configuration such that the appendage 124 follows a prescribed path into the receiver pocket 120. Preferably, the curvature of the appendage 124 has an average radius less than or equal to the distance from the rotational axis to the distal end of the pivotable obstruction member 106.

Figure 1C:
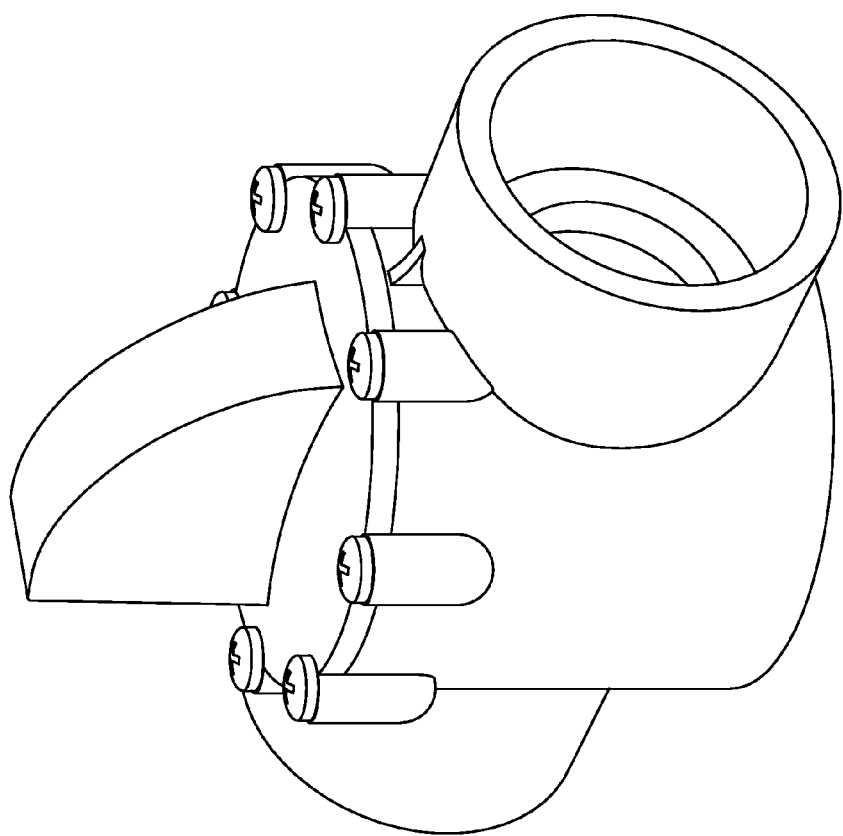

Both the mounting body 102 and the protruding lid 104 are preferably substantially optically clear and can be made of a clear plastic material. In one embodiment, a fixed scale 128 is imprinted or affixed to the sidewalls 108 of the mounting body 102 and/or the protruding lid 104 such that a visual measure of flow velocity can be ascertained by viewing the position of the appendage 124 from a distance, preferably more than 10 feet away. The pivotable obstruction member 106 is preferably mounted substantially perpendicularly to the flow through the fluid inlet port 114. In some embodiments, the pivotable obstruction member 106 is secured with an easily replaceable spring force system 130, which supplies an opposing force to the obstruction member against the direction of fluidic movement through the receptacle 110. In one embodiment, the spring force system 130 comprises a coaxially mounted spring adapted to change range and resolution of the assembly. For example, adding a stiffer spring constant or force allows for a decrease in the resolution of a fixed scale so imprinted or affixed to the outside of the mounting body 102 or protruding lid 104. In one implementation, indentations are formed on the exterior surface of the mounting body 102 and/or protruding lid 104 to accommodate stickers showing the various markings such as gallons per minute (GPM) or liters per minute (LPM). In another embodiment as shown in FIG. 1C, the assembly further comprises stiffening ribs disposed the exterior of the flow sensing assembly and view windows with label recess.

In operation, mass and momentum of the fluid such as water flowing through the inlet port 114 push the obstruction member 106 upwardly causing its appendage 124 to move from the receptacle 110 into the receiver pocket 120 of the protruding lid 104. The position of the appendage 124 along the fixed scale 128 provides a visual indication of the flow velocity. As fluid moves through a pipe or channel of a specific cross-sectional area, it carries with it force in the form of momentum that can be relative to the amount of mass transfer or volume of fluid flow through that point. In one embodiment, this force or volume of fluid of a given viscosity can be used to measure flow velocity by applying a constant force to the obstruction member or other form of restriction that is allowed to pivot about an axis perpendicular to the flow direction. As the volume and speed of the flow increase, the force upon the obstruction member or restriction will overcome the constant opposing force and cause the obstruction member to move about this perpendicular axis. The velocity of a fluid flowing through the receptacle 110 of the flow sensor assembly 100 can be a function of the angle, force, and cross-sectional area, and density of the fluid. In one implementation, an estimate of flow velocity for each pivot angle of the obstruction member 106 is calibrated based on the force required to move the obstruction member to the respective pivot angle. A scale is constructed to allow an indication of the measure by visual means through the appendage 124 or other attachment to the obstruction member 106 in the path of the flow by selecting the appropriate opposing force by way of a spring constant. In one embodiment, the spring constant can be made more or less linear over the range by design. In one implementation, the flow sensor assembly 100 is capable of reading +/−1.0 gallon per minute (GPM) in a 2 inch PVC pipe over a range of 0 to 100 gallons per minute (GPM).

In certain embodiments, the flow sensor assembly 100 provides a dual function indicator. The physical movement of the appendage 124 provides a direct visual method of determining velocity within the pipe or channel and also provides an electronic method of sensing by capacitive or magnetic proximity methods, by magnetic field rotation, Hall Effect, or by photonic means. In one implementation, the capacitive sensor provides data to MCU and wireless transceiver for remote data capture. In one implementation, an electronic magnetic field environment sensor is affixed to the protruding lid 106 and a microprocessor unit is used to collect and transmit data via wireless methods. In this implementation, a magnet is affixed to the obstruction or obstruction appendage. As the obstruction member 106 pivots, the appendage 124 moves into the protruding lid 106 and changes the magnetic field strength and direction of magnetic lines of force relative to the affixed sensor on the protruding lid 106, which in turn changes the strength of the magnetic field and the alignment of the magnetic field lines of force. The change in the strength and orientation of the magnetic field allows for indirect indication of velocity by electromagnetic field detection methods, such as a Hall Effect sensor inserted into a bridge circuit. By using two such Hall Effect bridge circuit sensors affixed to the outside of the protruding lid 106, fluid velocity can be measured by both the strength of the magnetic field and the orientation of the magnetic field. As the obstruction member rotates so does the magnetic fields. The angular movement is detected by two co-located bridge circuits with a foil type hall effect element inserted into each of the two bride circuits. These Hall Effect sensors can also be used to detect the magnetic field strength directly.

In another embodiment the magnet is affixed to the appendage and the magnetic field strength sensor is affixed to the top of the protruding lid such that as the appendage is rotated out of the mounting body, the magnetic field increases at the sensor. This way the rotation of the obstruction can be measured and transmitted wirelessly or otherwise to a receiver for action and processing to convert to feet per second velocity or other appropriate units of measure. In some embodiments, the combination of the rotation and strength is optimal, however stand along field strength or stand along field rotation angle sensing can be used as well.

In yet another implementation, an optical receiver is affixed to the protruding lid. As the obstruction member 106 pivots, the flapper 122 moves a small optical obstruction into the light path of the optical receiver. In a preferred implementation, there would be a differential measure using a beam splitter arrangement to sense the increase or decrease with rotation of the obstruction member. In one implementation, the movement moves a mirror so positioned in front of a fiber optical sensor probe. The movement decreases or increases the returned light and is an indication of the velocity of the fluid through the mounting body.

FIG. 2A illustrates another embodiment of the present invention which provides a flow sensor assembly 200 that can be mounted to an existing back check valve 202 or the like. In certain preferred implementations, the flow sensor assembly 200 is adapted to an existing back check valve by the attachment of a protruding indicator and installation of a protruding lid fitted with a special sensor that converts protrusion movement to flapper position data and transmits this data to a receiver for recording and subsequent data processing.

In one implementation, the flow sensor assembly 200 comprises a restriction 204 that is pivotably attached to an upwardly protruding indicator 206. The restriction 204 comprises a flapper 212 and an arcuate appendage 210 extending upwardly from the flapper 212. The upwardly protruding indicator 206 comprises a receiver pocket 208 adapted to receive at least a portion of the arcuate appendage 210 as the restriction 204 pivots about a axis perpendicular to the fluid flow direction 214. In another implementation, the upward protruding indicator 206 is configured to snap on to an aperture 216 in the conventional back check valve 202 thus upgrading the valve from a simple back check valve to one with a mounted flow indicator. In one implementation, the flow sensor assembly 200 further comprises a sensor that converts the arcuate appendage 210 movement to flapper 212 position data and transmits the data to a receiver for recording and subsequent data processing.

Figure 2B:
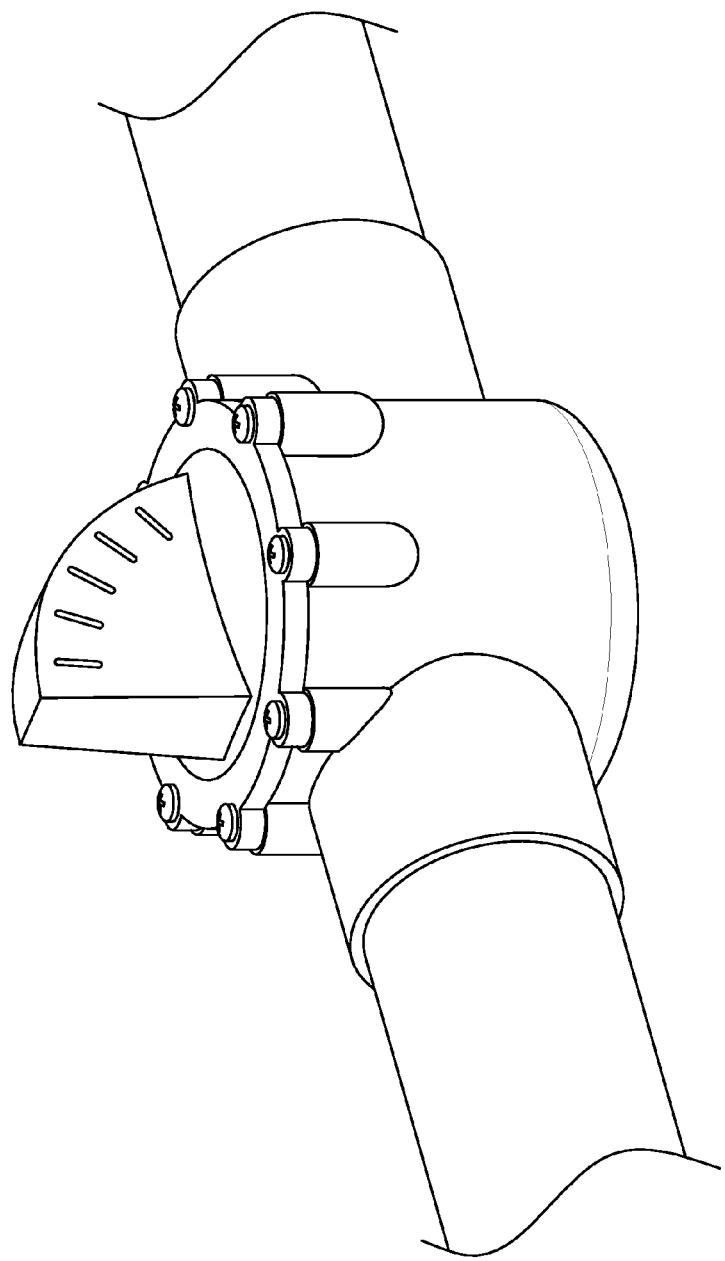

Advantageously, the flow sensor assembly 200 can be adapted for existing back check valves and other backflow prevention devices by mounting the assembly 200 using screw fasteners and other methods in the manner shown in FIG. 2B. In some embodiments, the protruding indicator 206 can be mounted to a check valve body and the appendage 210 mounted on the back of a check valve flap inside the check valve body. The check valve flap is so positioned in a flow stream and designed so as to make a seal with the aperture to prevent flow in one direction and hinged to pivot perpendicularly with the flow stream. In some implementations, the check valve flap is mounted on an upwardly protruding indicator that allows an appendage so affixed to the back of the flap to protrude out of the body of the back check valve body so it can be easily seen from long distances as well as being able to be remotely monitored.

In some embodiments, the flow sensor assembly 200 combines the function of a backflow device with the function of mass flow metering. By the addition of a protruding indicator above the flow stream and by providing a force opposing the rotation of the backflow flapper, flow velocity can be measured. In some implementations, the backflow flapper in a backflow prevention device can be used as the obstruction in the flow stream and its position viewed through the clear mounting body. Backflow seal condition can also be viewed when the mounting body is clear. In embodiments in which clear liquids or gases are flowing through the pipe, the position of the flapper can be read from a side against an imprinted scale.

In some other embodiments, the restriction 204 and the protruding indicator 206 so affixed and shaped to receive at least a portion of the restriction 204 are used to indicate flow magnitudes of existing fluid management systems. Many existing systems have pipes with special fitted sections that use a hinged restriction and an aperture to create a backflow prevention device. In one embodiment, the restriction does not function as a backflow device but rather functions as only an obstruction in the flow stream. In one implementation, the restriction is based on a spring loaded restriction pivoting about a shaft axis set perpendicular to the flow of the fluid. The size of the restriction, the spring constant, and spring position along with the mass and flow rates and scale resolution dictate the precision and accuracy of the system. In some embodiments, the shaft provides a diffracted beam from a laser source impinging upon a photonic receiver. The greater orders or lower energy and movement of the relative angle of the impinging beam will be translated across the photonic sensor and the intensity can indicate shaft position. Because shaft is fixed to obstruction rotation position flow is measured. In other embodiments, an optical path is occluded by the protrusion whole sizes or other means that occludes more light as the protrusion enters the optical path indicating rotation of the flap.

Figure 3:
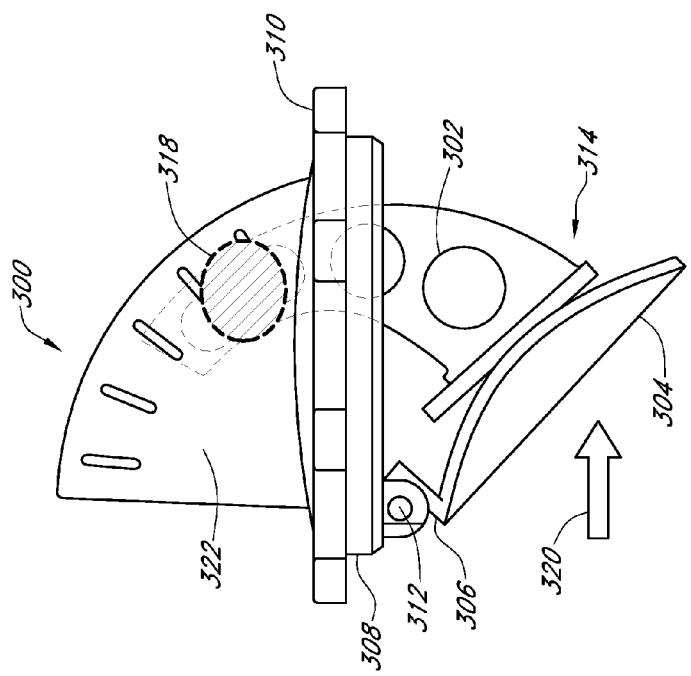
FIG. 3 illustrates a protruding lid of one preferred embodiment that is incorporated in a check valve.

FIG. 3 illustrates a flow sensor assembly 300 of another preferred embodiment. The flow sensor assembly 300 is designed with an assembly appendage 302 that has a dual function of visual indicator, optical occluded and dielectric field reducer. The design affords electronic methods of sensing by capacitive proximity methods or by photonic methods. The obstruction member 304 comprises an obstruction mount platform 306 that rests on a receiver body 308 that can be itself substantially clear. The sensor mount lid 310 is substantially clear and so designed to mount an obstruction hinge pivot shaft 312 perpendicular to the direction of flow 320. A pivoting obstruction assembly 314 that is substantially within the mass flow stream channel is affixed to the sensor mount lid 310 and is hinged such that the assembly appendage 302 creates an obvious protrusion up and out of the body of the and out of the flow stream path such that it occupies a pocket 322 in the substantially clear sensor mount lid 310. In back check valve adaptations, the obstruction member 304 is mounted in the sensor mount lid 310 and pressed against a smaller aperture in the channel of a valve body by spring loading. The flow is only one way in this embodiment. The movement of the obstruction member 304 moves the assembly appendage 302 up into the sensor mount lid 310 and displaces fluid within the receiver 322 in the sensor mount lid 310 and changes the electronic dielectric environment. The displacement of water within the sensor mount lid 310 by a material of lower dielectric strength allows for indirect indication of velocity by electronic field detection means. The physical movement of the indicator provides a direct visual means of determining velocity within the channel in the valve body. In a preferred embodiment, the appendage moves in relation to the angle of the obstruction member about the shaft as the fluid moves through the pipe. This appendage is so positioned that it provides a clear indication of the movement of the restriction in the flow stream. This appendage protrudes predominantly up and out of the body of the back check valve body.

In one implementation, the rotation of the obstruction member 304 or flapper moves a small optical obstruction into the light path of an optical receiver 318. Preferably, there is a differential measure using a beam splitter arrangement to sense the increase or decrease with rotation of the obstruction member. In one non-limiting example, the movement moves a mirror so positioned in front of a fiber optical sensor probe. The movement decreases or increases the returned light and is an indication of the velocity of the fluid through the assembly or an aperture. The electronic data can be acquired and processed by way of micro-processor unit and transmitted for wireless monitoring of the flow and velocity. Analog position and wired amperometric position signals can be realized by optical means when the protrusion occludes the optical path of a light source.

The obstruction member 304 disposed within the aperture of a valve body or measurement channel in one embodiment is so designed so as to resist debris and fouling and functions in coordination with the shape of the aperture to allow a particular linear response function over the range of flow velocity expected in that application. The obstruction member is preferably so shaped as to work also with the spring constant or combination of spring constants when multiple springs are used to provide a non-linear or more linear range of operation against a fixed scale located along the path of the protrusion. Resistance to the rotation about the shaft is regulated by springs that may or may not be coaxial with the shaft. In some embodiments, there is an adjustable flap swing limit. The spring or set of springs allow calibration of the amount of rotation relative to the flow. A stiffer spring would restrict flow ranges to higher flow velocities. A weaker spring would result in lower flow range sensitivity. In a preferred embodiment, a capacitive sensor is used to measure the water displacement within the chamber by the plastic protrusion. The data is sent via wireless methods as an indication of flow in the pipe for the digital methods, and an optical method is preferred where an analog signal is used.

Swimming Pool Applications

Figure 4:
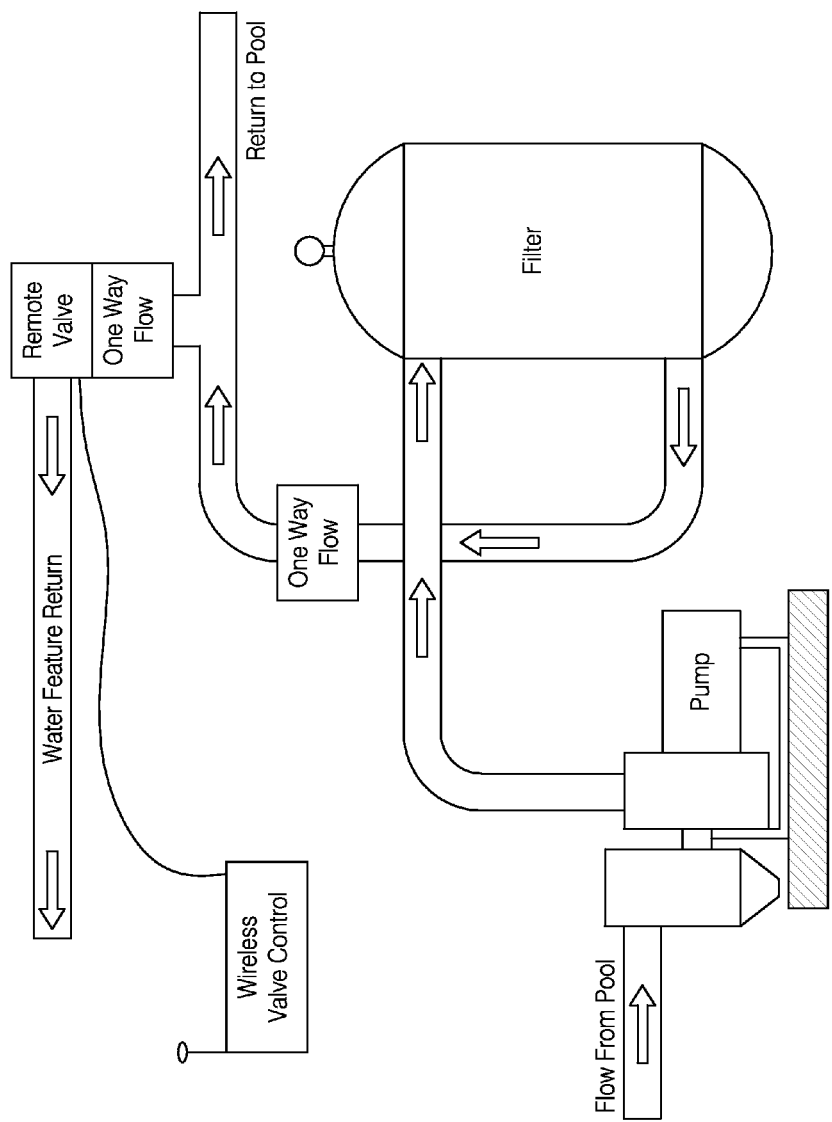
FIG. 4 illustrates a swimming pool plumbing system incorporating a flow sensor assembly of a preferred embodiment.

Wireless remotely monitored water velocity sensors with visual validation of certain preferred embodiments can be used in the management of public and private water systems. In one implementation, the wireless remote mass velocity sensor of certain preferred embodiments can be used to monitor the velocity of water flow in a public pool system as shown in FIG. 4. The velocity of water through a pump is important to insure safety rule compliance with operation of public swimming pool water management systems. Measurement of flow monitoring has become important for public swimming pool safety compliance laws. A flow sensor device for monitoring and measurement of the velocity of water flow in a pipe or channel that is being pumped for filtering or recreational use is of particular importance for energy efficiency, performance of sanitation equipment and physical site safety. The velocity of a fluid in a pipe has mass and momentum and setting maximum velocities for recreational water management systems are important for public safety to help reduce and prevent suction entrapment accidents. The velocity of water in a pipe is a function of mass transfer past a point with time and this data can be indirectly measured by measuring the momentum of a mass impinging upon an obstruction through a fixed aperture. It is important to be able to simultaneously monitor this by automation machinery, governing bodies and on-site maintenance persons. In one preferred embodiment the wireless signal can be received and monitored by smart systems and alarms set to warn of operation out of system parameters. The visual indicator provides on-site real time monitoring of flow streams to insure constant safe operation. If water flow reaches above the velocity standards for that particular system then alarms can be set and relays set to turn motors off low flow conditions and filter flow parameters monitored for changes remotely or on site visually.

Multiple Subsystems on One Pump

In many recreational water systems where pumps are shared between several subsystems an indicator of flow distribution is needed. Pumped water is directed to various subsystems where the total dynamic head is best distributed in some un-equal manner among several subsystems from a single pump. As filters age flow rates change given constant current pumping. It is difficult to design a system that will maintain proper flow velocity into each subsystem over the life of the installation. The preferred embodiment allows for valves to be adjusted maintaining the system flow dynamics even as system ages. A direct visual readout with annotations relative to the scale imprinted on the protruding lid allow for a reset of flow velocities to design distribution values. In addition when the system is maintained flow can be restored easily using clearly marked appendage position indicators on the outside of the lid.

New means of controlling pump speeds are now growing in the pool, spa and water feature industries as well as all water pumping and water management facilities due to the tremendous benefits of energy savings and system performance. For example filters operate better when the gallons per minute are optimally maintained. In addition flow rates in excess of system hydrodynamic limits waste energy and do not operate effectively to maintain water quality.

These new technologies require new flow metering and flow velocity measurement solutions. All of these improvements benefit from a feedback from flow metering systems. Flow sensor assemblies designed according to certain preferred embodiments will provide wireless installation of a dual readout flow velocity, which will likely improve level of safety for recreational water management systems. The cost of these systems can be additionally reduced by maintaining minimum flow velocities. By management of flow velocity using a wireless remote monitored flow velocity system the most efficient flows can be maintained even when flow dynamics are changing in the system.

Examples of subsystems that require multiple diversions or multi-use single pump arrangements are roof mounted solar heating systems, heaters, sanitation devices, waterfalls among other pool water features. All of these systems operate optimally over specific flow ranges. Some of these systems such as heat exchangers do not operate outside of design flow range. In many cases multiple sub-systems may be installed on the same pump system and operate independently as well as simultaneously depending on mode of operation. These complex recreational water systems require flow adjusting valves to maintain flow rates within the system to each component at the proper operational levels. The valve settings are very critical to distribute flow properly. The valve settings can be difficult to reproduce manually. Many times the difference between proper settings and improper settings are very small. It is useful to have direct flow metering solution installed in-situ to help the maintenance persons deliver proper flow and to monitor proper flow to these various subsystems serviced all by a single pump source. It is important to the lifetime and maintenance of these systems that the proper flow rates are monitored and maintained. Preferred embodiments of the present invention improve the ability and cost of implementing visual and electronic means of flow monitoring of liquid flow.

Embodiments of the invention also provide an improved and additional function of volume flow measurement in any position and at any angle in turbulent or non-turbulent flow conditions. In addition this allows non-nadir viewing of the flow in the pipe. Many types of flow meters operational over the range of flows expected in this application fail in typical installations where there are many turns of the plumbing in a small area. This creates turbulence that changes the accuracy of other flow meter indicators. It is noted that in one preferred embodiment, turbulence is less important to accurate flow indications or measures. Using the embodiment so described allow velocities, flow rates and fluid movement in a network of channelized and diverted and sub-divided pipe systems to be readily monitored and rapidly visually verified.

In one preferred embodiment, flow is measured electronically by capacitive means in order to monitor for entrapment in swimming pool, spa and water features. Calculating and maintaining flow specifications for anti-entrapment solutions is critical. In one embodiment of the invention a scale is provided that reads out in gallons per minute (GMP) This unit of measure is critical to assess systems for installation of anti-entrapment devices. In one preferred embodiment the flow velocity is indicated on a fixed scale in relation to an indicator arm. In another embodiment the device is electronically monitored for flow fluctuations and is part of the anti-entrapment device that stops motors or pumps from operating to prevent entrapment events. The interruption of flow can trigger an event to stop an entrapment event or prevent serious injury from an entrapment event.

Preferred embodiments of the present invention provide a flow sensor assembly that improves the ability to measure the flow of fluids and materials in pipes and channels. There is an improved ability to view the flow and volume of flow from greater distances and at angles currently not available and non-nadir. Electronic and optical devices and methods can be used to measure the flow rates remotely.

In one other preferred embodiment a protrusion and clear lid so affixed and shaped to receive the protrusion is used to indicate flow magnitudes. Many fluid management systems have pipes with special fitted sections that use a hinged restriction and an aperture to create a backflow prevention device. In one preferred embodiment the obstruction does not act as a backflow device but only acts as an obstruction in the flow stream. These restrictions and obstructions in one embodiment are based on a spring loaded restriction pivoting about a shaft axis set perpendicular to the flow of the fluid. The size of the obstruction the spring constant and spring position along with the mass and flow rates and scale resolution dictate the precision and the accuracy of the system.

Certain preferred embodiment of the present invention improves the ability to measure the flow of fluids and materials in pipes or contained channels. There is an improved ability to view the flow and volume of flow from greater distances and at angles not currently possible and non-nadir. Electronic means and optical means can be used to measure the flow rates remotely. In one embodiment the rotation of the shaft of the device is affixed to the flapper and is used to indicate flow rate by the translation of a beam of light across a graduated sensor element. In another embodiment an optical occluded is used to occlude the light being received by a light sensor as the obstruction is moved in the flow stream.

It is noted in one preferred embodiment that as the restriction placed in the path of flow it is allowed to rotate about a shaft to which it is affixed and whose axis of rotation is substantially perpendicular to the flow direction of the material flow direction. In one preferred embodiment the cross-sectional area of the obstruction changes in a known and fixed manner as the obstruction is pushed about the axis of rotation with the increasing force of flow against it. In one preferred embodiment the cross-sectional area of the obstruction in the flow stream decreases as it rotates up and out of the flow stream. This reduction in cross-sectional flow in combination with the relatively constant spring tension in one embodiment is so calibrated as to provide a more linear measure of flow stream volume. In one other preferred embodiment the spring position can be changed by a screw adjustment and enable recalibration of the scale relative to flow range and other parameters. It is desired that observers can view the change in angle of the restriction easily from all angles. A substantially clear lid in one embodiment allows such viewing angles across equipment rooms and to simultaneously view several interconnected flow streams. In one preferred embodiment in a swimming pool adjustments to filter flow can be made to optimize filtering capacity. This flow rate can be easily recorded and marked on the substantially clear lid structure to indicate proper flow rates as a function of position of the indicator protrusion relative to the fixed and clear lid. The clear lid in one preferred embodiment has a scale that is painted or inscribed upon it such that quantitative measures can be made.

Figure 8A:
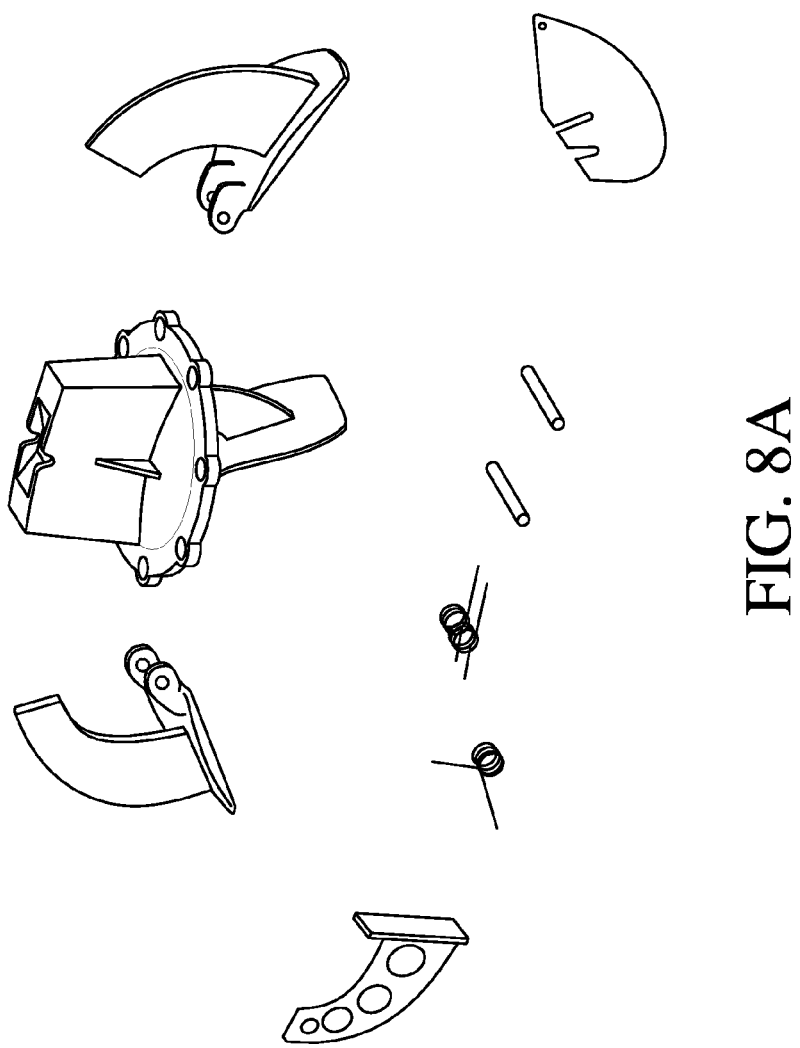
FIGS. 8A-8C illustrate different shapes and configurations of the flapper that can be used in flow sensor assemblies according to certain preferred embodiments.
Figure 8C:
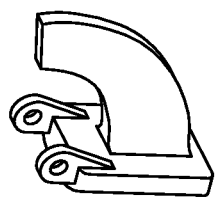
Figure 8B:
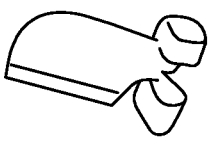

In one embodiment, the flapper or restriction is designed to fit within a receiver to stop the flow of fluid or material in one preferred direction. FIGS. 8A-8C illustrates a number of different shapes of the flapper or restriction that can be used. The shape of the flapper or restriction can be modified to provide various response functions to different materials. For example in one preferred embodiment the restriction is oval or ellipsoid. In another preferred embodiment, the shape of the restriction is largely rectangular. In yet another preferred embodiment the shape of the restriction within the path is triangular. In one preferred embodiment multiple springs are used to create a more or less linear response function to the restriction in the flow at various velocities or volumes of flow.

Figure 5:
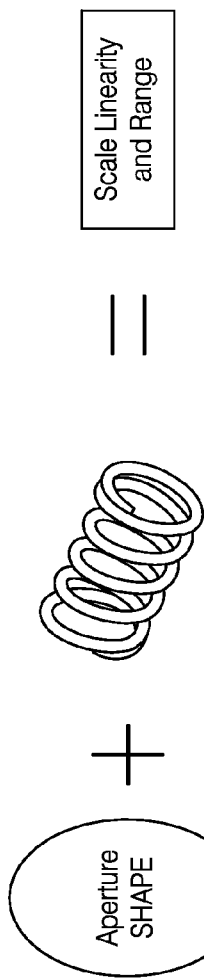
FIG. 5 is a graph illustrating measured linearity of a flow sensor assembly of one embodiment of the present invention.
Figure 5:
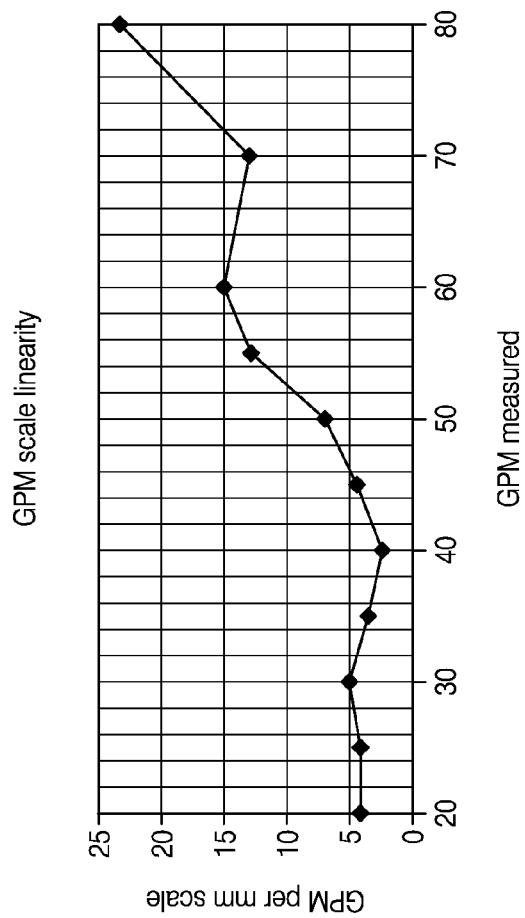
Figure 6:
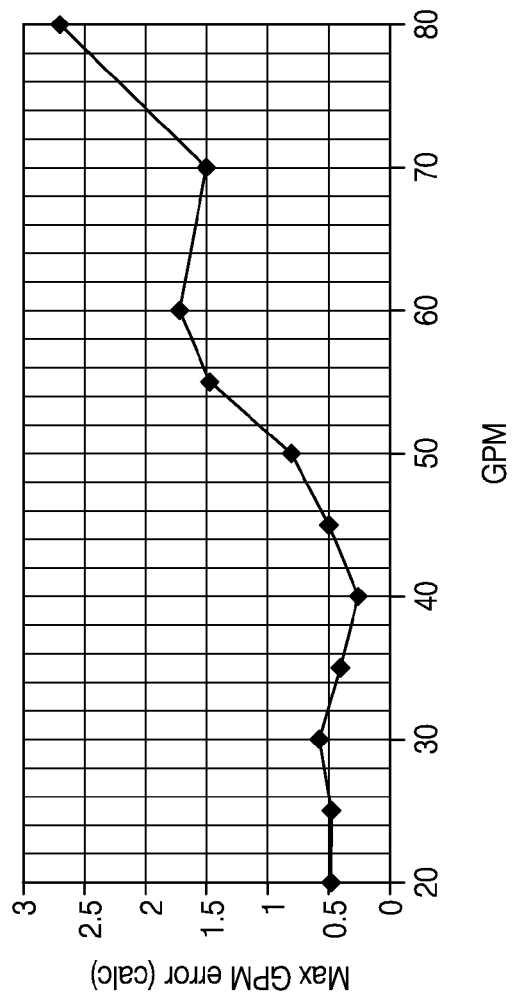
FIG. 6 is a graph illustrating data from the magnetic field sensor according to one embodiment of the present invention.

In yet another preferred embodiment a CCD array is so affixed so as to allow a digital record of position and therefore a digital record of flow rate at that time. FIG. 5 is a graph illustrating the relationship between the GPM/mm scale linearity according to one preferred embodiment.

A curved protrusion that is mounted on the back of a check valve flap inside a check valve body so positioned in a flow stream with a check valve sealed type obstruction so positioned in the flow stream and designed so as to make a seal with the aperture to prevent flow in one direction and hinged to pivot perpendicular with the flow stream. A known force is applied to the obstruction to hold it into place against the seal of the aperture to prevent flow in one direction and allow flow in the opposite direction. A measurement of an opposing force of impinging mass in the flow direction is taken using a force sensor. The position of the spring stop can be adjusted to calibrate the response of the indicator to flow volume. In one preferred embodiment a spring of known spring constant is used to apply a known force over a distance. In one preferred embodiment this spring is about an axis of rotation and the obstruction is hinged and rotates and pivots out of the flow stream as force is applied in the direction o flow. The obstruction is held in place by this spring and the obstruction movement in the flow direction is measured by a visible scale indicator that is positioned on the backside of the obstruction and is visible from a distance. Mass flow is measured by the amount of rotation about the axis of rotation and is indicated by a marked fixed scale and movement of an indicator attached to the obstruction.

In the embodiment of the invention as a flow meter where linearity in the movement of the indicator is desired over a range of movement relative to the velocity or some other parameter or unit of measure such as gallons per minute or liters per minute one can appreciate the relationship between the aperture of the entry into the bowl of the body or housing. This housing has a shape that when combined with the aperture and shape of the flapper that rests against this aperture and resides substantially within this bowl chamber the combination of which substantially dictates the flow dynamics of a fluid through this system. In one preferred embodiment we describe a particular shape for the obstruction and the aperture of the housing. In one preferred embodiment we show a particular bowl shape housing that mounts the lid structure and the obstruction within the aperture. One skilled in the art can appreciate the dynamics of the flow through this system in terms of velocity unit increase relative to the indicator/obstruction rotation and movement against a scale. The relative motion between the indicator and the scale over the range in one preferred embodiment can be designed to have a different relativistic response function by changing the obstruction shape relative to the aperture shape as well as the bowl shapes and spring tension. The aperture and spring function can be simplified by the schematic below. The data represents data showing non-linear behavior in simple systems. The application of a stiffer spring in this system provides an improved linearity over the range of flow measurements in units of Gallons Per Minute.

The design is scaleable to a larger system and electronic sensor of embedded magnets into the indicator with a mounting socket on the top of the multi-lid allow for electronic sensing of the flow to better than 0.01 gallons per minute (GPM) resolution. The movement of the indicator is of sufficient magnitude in one preferred embodiment to allow high resolution electronic sensing of flow. In one preferred embodiment a magnet is glued into a hole within the indicator portion of the system The movement of the magnetic field is sensed by a hall effect field rotation sensor located at the top of the lid within a mount so designed for this purpose. A signal is generated from the movement of the indicator and the movement of the magnetic field across this fixed field sensor. The movement has been measured to better than 0.01 GPM over the range of movement. In one embodiment a wireless sensor is used to send the flow data to a wireless receiver display system controller for processing. Direct wired system controllers can also be sent position data in terms of GPM so that subsequent actions such as pump control can be accomplished. In one embodiment a legacy 0 mA to 20 mA signal is generated to allow remote control of pump operations by analog signals. In one preferred embodiment the linearization of the scale can be accomplished in the electronic domain either analog scaling or digital correction over the range of the indicator movement.

Figure 7A:
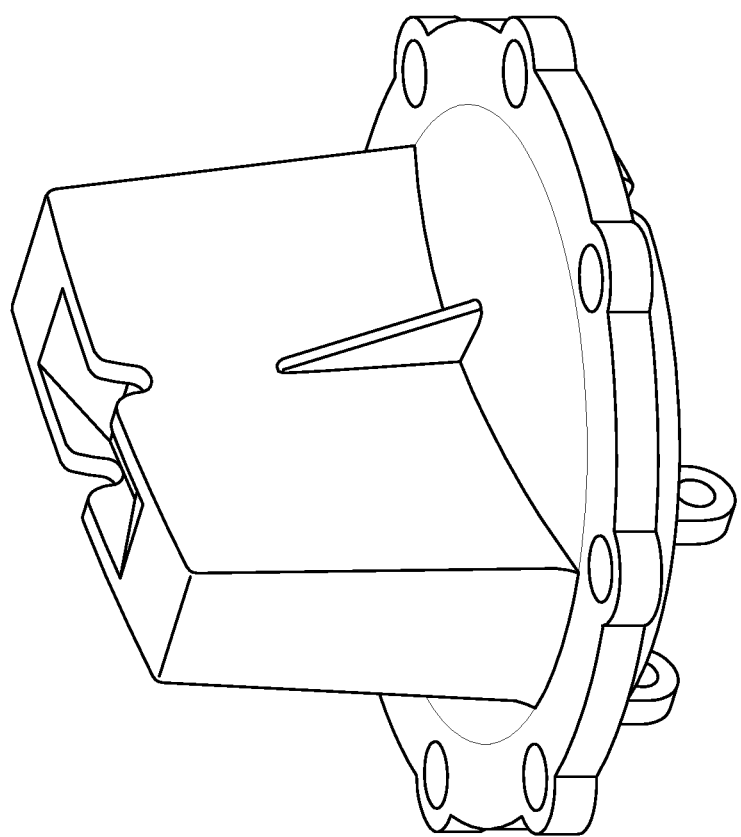
FIGS. 7A and 7B illustrate multi-use lid designs to be used in flow sensor assemblies according to certain preferred embodiments.
Figure 7B:
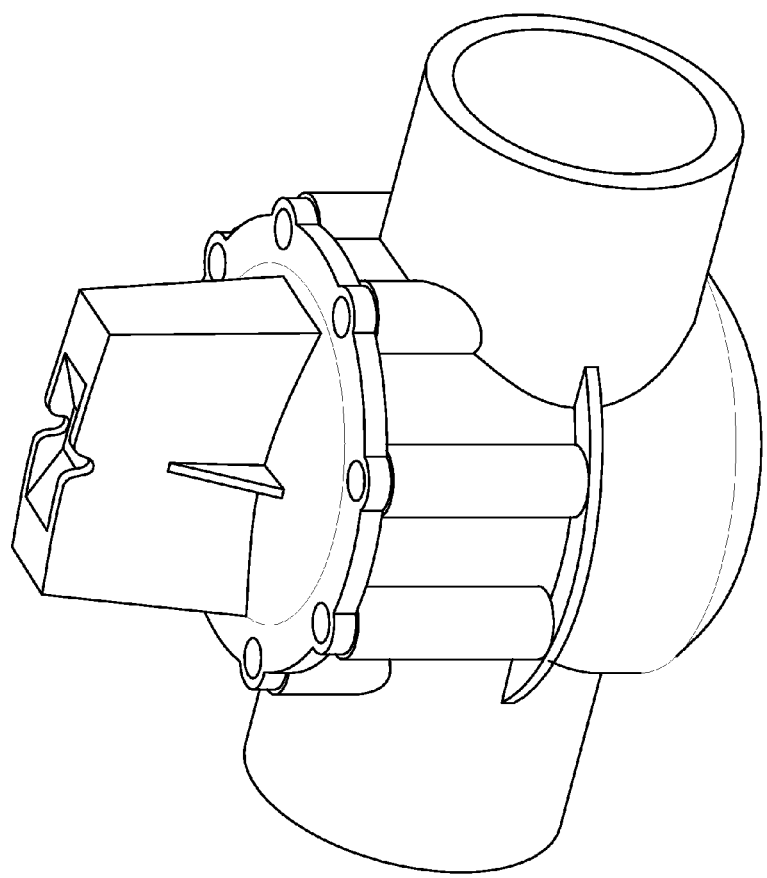

FIG. 7A illustrates a multi-use lid design that can be used in multiple configurations to measure flow on the suction or the discharge side of a water pumping application, such as measuring flow in and out of a filter system. FIG. 7B illustrates a flow sensor assembly adapted for a multi two way flow indicator system. In one preferred embodiment the multi-purpose lid configuration can be used to scale to large diameter pipes. All Clear visual indicator system for obstruction position and seal visualization as used in one preferred embodiment where debris may interfere with operation of the indicatory system. Clear body as designed for one preferred embodiment of the invention where a removeable top is desired and clear visualization of the obstruction aids in indication of flow direction and velocity.

Figure 9:
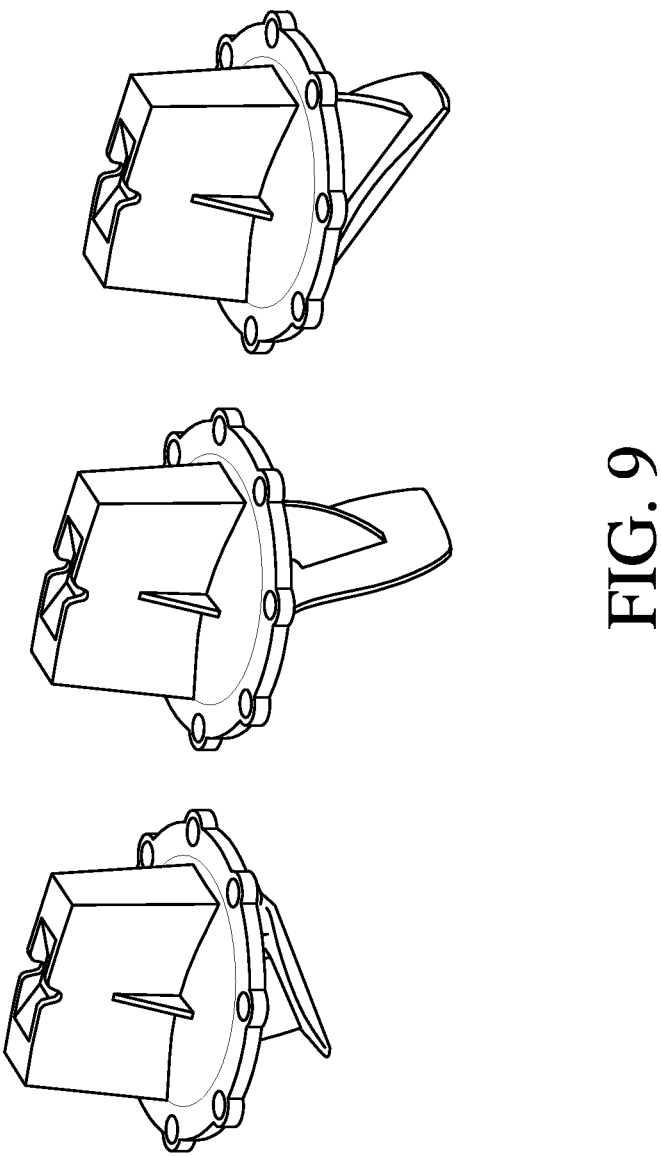
FIG. 9 illustrates three way design in one lid as used in one preferred embodiment.
Figure 10:
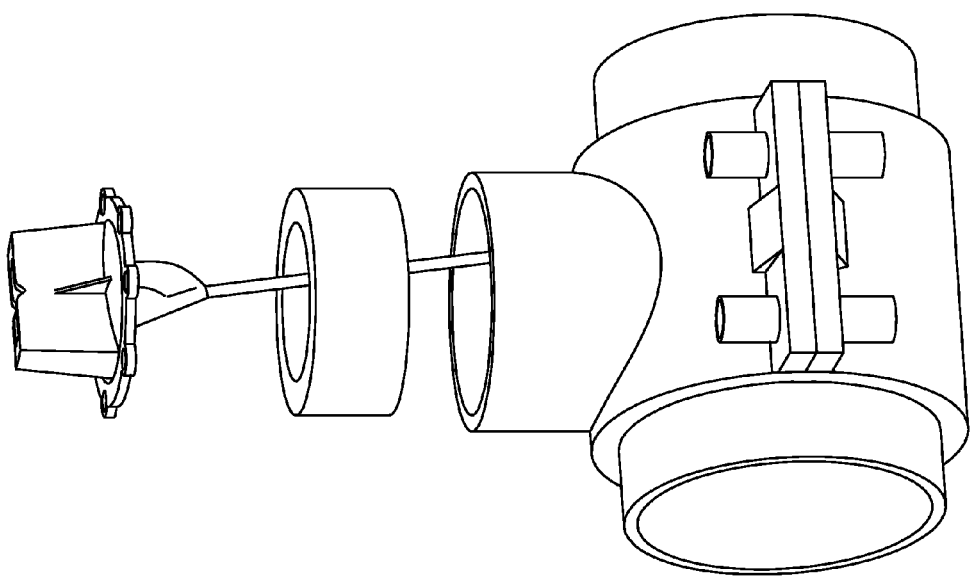
FIG. 10 illustrates a flow sensor assembly of one embodiment which can be inserted into the saddle and cutout into a flow pipe.

FIGS. 8A-8C illustrate some of the various configurations of the obstruction member or restriction that can be used in preferred embodiments of the present invention. FIG. 9 illustrates three way design in one lid as used in one preferred embodiment; FIG. 10 illustrates a flow sensor assembly of one embodiment which can be inserted into the saddle and cutout into a flow pipe; and FIG. 11B provides a cutaway view of the obstruction in the flow stream of the pipe and the insert into a saddle assembly. In this embodiment, the indicator can be cut to length to fit precisely into the flow stream. FIG. 11B shows a preferred embodiment of the indicator in the central position of the multipurpose lid. One can appreciate the scalability of this solution to larger diameter or variable diameter pipe systems.

An aperture that has a hinged obstruction that can reside either within the aperture or seal against the edges of the aperture but free to swing away from the aperture in the case of flow of mass impinging against it. The bowl body of the structure that houses the aperture and mounts the removeable lid that again mounts the hinged obstruction that seals against the aperture. It is important that the body of the bowl structure be so designed as to work in concert with the aperture shape function with flow volume or mass movement and the shape of the obstruction and the change in profile exposed to the flow stream as well as the shape of the bowl structure and surrounding superstructure that mounts the indicator lid structure and hinged obstruction.

In certain embodiments of the invention, design features of the flow sensor assembly that work together to change the dynamic range and resolution and performance are the spring constant, the aperture shape, obstruction shape and structure/bowl shape. The way the mass impinging upon the obstruction is released back into the flow stream is dictated by the shape of the bowl structure. In one preferred embodiment the bowl structure is asymetric relative to a plane anywhere perpendicular to the axis of flow of mass through the aperture. The aperture is a hybrid rounded square elipsoidal pattern superimposed upon the face of the obstruction seat. This obstruction seat is eliptical or circular as viewed from a ray perpendicular to the axis of flow and viewed at right angles (NADIR) from the lid seat plane.

Although the foregoing description of the invention has shown, described and pointed out novel features of the invention, it will be understood that various omissions, substitutions, and changes in the form of the detail of the apparatus as illustrated, as well as the uses thereof, may be made by those skilled in the art without departing from the spirit of the present invention. Consequently the scope of the invention should not be limited to the foregoing discussion but should be defined by the claims.

What is claimed is:

1. A fluid flow sensor assembly adapted for measuring in-line fluid velocity, comprising:
   a fluid obstruction member, said obstruction member comprising an elongated arcuate appendage extending outwardly from a distal end of the obstruction member;
   an indicator lid assembly, said indicator lid assembly having an arcuate configuration forming an arcuate protruding upper portion, and comprises a rim and a receiver pocket adapted for receiving at least a portion of the arcuate appendage; and
   wherein said fluid obstruction member is attached to the indicator lid assembly via a rotatable shaft, wherein the fluid obstruction member is pivotable about the shaft in a manner such that the elongated arcuate appendage moves in an arcuate path inside the indicator lid assembly, wherein the rim of the indicator lid assembly is adapted to attach to an aperture in a pipe line.

2. The assembly of claim 1 wherein the elongated arcuate appendage is a hollow plastic appendage which is pushed up into the receiver pocket.

3. The assembly of claim 1, wherein the position of the obstruction member is sensed electronically.

4. The assembly of claim 1, wherein the position of the obstruction member is sensed optically.

5. The assembly of claim 1, wherein the flow position is indicated visually against a scale imprinted on the indicator lid assembly.

6. The assembly of claim 1, wherein the obstruction member movement moves an electronic connection over discrete conductive pads leading to resistors integrated to change resistance of a circuit resulting in a change in current.

7. The assembly of claim 1, wherein the obstruction member has a magnet at distal end and movement is detected by Hall Effect.

* * * * *